July 6, 1954  F. L. RUHL  2,683,233

ROTOR FOR DYNAMOELECTRIC MACHINES

Filed Feb. 6, 1951

INVENTOR.
FREDERICK L. RUHL
BY
Willits, Hardman
HIS   ATTORNEYS

Patented July 6, 1954

2,683,233

UNITED STATES PATENT OFFICE 2,683,233

ROTOR FOR DYNAMOELECTRIC MACHINES

Frederick L. Ruhl, Covington, Ohio, assignor to General Motors Corporation, Detroit, Mich., a corporation of Delaware Application February 6, 1951, Serial No. 209,591

2 Claims. (Cl. 310—270)

This invention relates to improvements in rotors for dynamo-electric machines.

It is among the objects of the present invention to provide the rotor of a high speed dynamo-electric machine with a retaining cap which is tightly secured to one end of the rotor and encompasses the winding loops extending from said one end of the rotor for preventing outward displacement of said loops and consequent damage by their contact with non-rotating portions of the dynamo-electric machine when it is being operated at high speeds.

Another object of the present invention is to provide the rotor of a high speed dynamo-electric machine with a winding loop encompassing cap as described in the aforegoing paragraph, said cap and particularly the portion thereof encompassing the extending winding loops being provided with a plastic lining which, when the cap is assembled upon the rotor, is forced into the interstices between the several winding loops. The plastic material is preferably of the self setting or hardening type and therefore securely holds the several winding loops against relative displacement due to centrifugal force while the dynamo-electric machine is being operated at high speeds.

Further objects and advantages of the present invention will be apparent from the following description, reference being had to the accompanying drawings wherein a preferred embodiment of the present invention is clearly shown.

Figure 1:
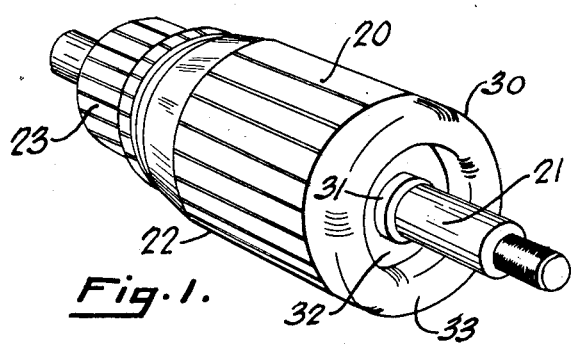
Fig. 1 is a perspective view of a dynamo-electric machine rotor equipped with the present invention.
Figure 2:
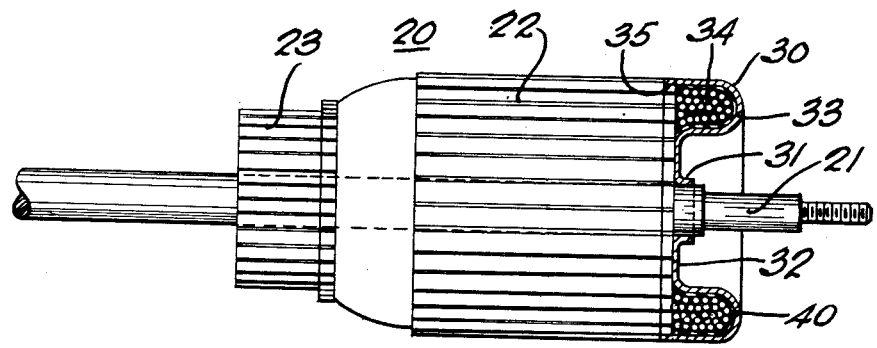
Fig. 2 is a side elevational view of a similar rotor, the extending winding loops and encompassing cap being shown in section.
Figure 3:
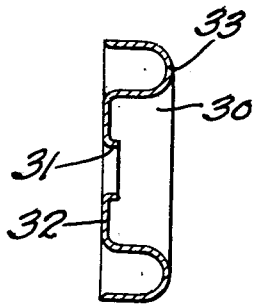
Fig. 3 is a transverse sectional view of the encompassing cap.
Figure 4:
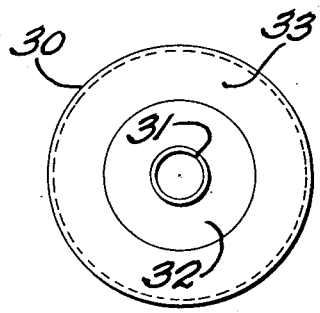
Fig. 4 is a front view of the cap.

Figs. 1 and 2 of the accompanying drawing illustrate a dynamo-electric machine rotor 20 equipped with the present invention. The rotor 20 consists of a shaft 21 upon which the body 22 of the rotor is secured. This body 22 is made up of a stack of metal laminae having radial slots extending longitudinally of said body. A commutator 23 is also mounted upon shaft 21. Loop windings are placed in predeterminately spaced slots of the rotor, the ends of each loop winding being electrically attached to respective bars of the commutator 23. Generally each winding of the rotor consists of a plurality of convolutions of wire the end loops extending from each end of the rotor body 22 being folded or placed one upon the other and forming a circular stack. The ends of the several windings being stretched over the end loops at the end of the body 22 adjacent the commutator 23 and then electrically attached to the bars of the commutator provide taut retaining means which prevent these end loops at the commutator end of the rotor from being displaced outwardly by centrifugal force. However, the coil end loops at the opposite end of the rotor are not supported in this manner and thus are subject to outward displacement by centrifugal force, especially when the rotor is part of a high speed operating dynamo-electric machine. When these end loops are not properly fortified against the effect of centrifugal force, they move outwardly at high speeds and engage and rub against non-moving parts of the machine, thus destroying the insulating material about the wire and rendering the machine inoperative due to short circuits.

The present invention provides a retainer cap 30 secured to the rotor and holding the winding loops securely against any movement due to centrifugal force. This cap may be made of any suitable material, preferably sheet metal so as to be rigid. Cap 30 has a hub portion 31 adapted to be forced upon the rotor shaft 21 so as to fit tightly thereupon. A flat, disc-like, central portion 32 abuts against the end of the rotor body 22 when the cap 30 is in proper position on the rotor shaft. The annular portion 33, C-shaped in cross section, encompasses the circular stack 34 formed by the end loops of the windings in the rotor. The outside diameter of cap 30 is the same as the outside diameter of the body portion 22 of the rotor. To make the cap more rigid and to assure its secure attachment to the rotor, the outer peripheral edge portion of the cap is pressed into an annular recess 35 formed in the peripheral surface of the rotor body 22 at one end thereof.

Before pressing the cap 30 onto the shaft and body portions of the rotor, the inner surface of the C-shaped annular portion 33 of the cap is provided with a plastic coating 40. This plastic coating may be of any suitable material which is plastic when applied but which is self setting, that is, becomes hard and immovable after being exposed to atmosphere. When the coated cap is pressed into position upon the rotor, this plastic coating is forced into the interstices between the several wire loops forming the circular stack 34. Hardening of the plastic material thus holds all of the wires of the loops in the stack 34 against relative movement due to centrifugal force and thereby avoids short circuits.

Ordinary rotors in which no special provision has been made to hold coil end loops against displacement are readily disabled and rendered useless when operated at high speeds. Such unsupported coil end loops will shift outwardly due to centrifugal force and be thrust and rotated against the surfaces of stationary parts of the machine, as for instance the stator or field members of the machine. This will cause short circuits by destruction of the insulation on the coils or even complete severance of said coils.

Rotors equipped with the present invention are completely free of this destructive phenomenon. Centrifugal force has no effect upon the coil end loops encompassed by the supporting cap. Such rotors have been successfully operated at exceedingly high speeds before attainment of which the ordinarily constructed rotor will have exploded and be rendered useless.

While the embodiment of the present invention as herein disclosed, constitutes a preferred form, it is to be understood that other forms might be adopted.

What is claimed is as follows:

1. In a device of the character described, the combination with a rotor of a dynamo-electric machine, said rotor being supported by a shaft and having overlapping winding loops extending in the form of an annular stack from one end thereof, said end of the rotor having an annular recess in the peripheral surface of a rigid cap having an integral hub portion fitting tightly about the shaft, a flat portion abutting against the end of the rotor body and a portion fitting about and encompassing the circular stack of winding loops, the peripheral edge of the cap tightly fitting about and in said annular recess in the end of the body of the rotor, said cap holding the extending winding loops against outward displacement as the rotor is operated at high speeds.

2. The combination with an armature having a shaft and a core secured to said shaft, said core having an annular recess in the peripheral surface at one end thereof and a protruding annulus formed by coil loops extending from said core end; a rigid cover having an end portion fitting tightly about the recessed end of the core and press fitted about said shaft, said cover encompassing and engaging the said protruding annulus to prevent dislocation of the coil loops by centrifugal force.

References Cited in the file of this patent

UNITED STATES PATENTS

| Number | Name | Date |
|---|---|---|
| 1,769,063 | Kinman | July 1, 1930 |
| 2,340,905 | Sigmund et al. | Feb. 8, 1944 |
| 2,427,232 | Hoover | Sept. 9, 1947 |

FOREIGN PATENTS

| Number | Country | Date |
|---|---|---|
| 433,364 | Great Britain | Aug. 13, 1935 |
| 494,601 | Great Britain | Oct. 23, 1938 |
| 612,076 | France | July 24, 1926 |